US012559292B2

(12) United States Patent
Ashton et al.

(10) Patent No.: US 12,559,292 B2
(45) Date of Patent: Feb. 24, 2026

(54) PACKAGE CONTAINING WATER-SOLUBLE CAPSULES

(71) Applicant: Conopco, Inc., Englewood Cliffs, NJ (US)

(72) Inventors: Ross David Ashton, Northwich (GB); Kieran Dean Owens, Wrexham (GB)

(73) Assignee: Conopco, Inc., Englewood Cliffs, NJ (US)

(*) Notice: Subject to any disclaimer, the term of this patent is extended or adjusted under 35 U.S.C. 154(b) by 73 days.

(21) Appl. No.: 18/289,729

(22) PCT Filed: May 3, 2022

(86) PCT No.: PCT/EP2022/061818
§ 371 (c)(1),
(2) Date: Nov. 6, 2023

(87) PCT Pub. No.: WO2022/238179
PCT Pub. Date: Nov. 17, 2022

(65) Prior Publication Data

US 2024/0286813 A1 Aug. 29, 2024

(30) Foreign Application Priority Data

May 14, 2021 (EP) .................................... 21173811

(51) Int. Cl.
*B65D 65/46* (2006.01)
*B65D 5/56* (2006.01)
(Continued)

(52) U.S. Cl.
CPC ........... *B65D 65/466* (2013.01); *B65D 5/563* (2013.01); *B65D 50/045* (2013.01); *B65D 85/70* (2013.01); *C11D 17/042* (2013.01)

(58) Field of Classification Search
CPC .......... B65D 5/563; B65D 5/68; B65D 50/04; B65D 50/045; B65D 65/46; B65D 65/466;
(Continued)

(56) References Cited

U.S. PATENT DOCUMENTS 4,416,791 A * 11/1983 Haq .................... C11D 17/041 206/524.7
5,453,372 A 9/1995 Vetter et al.
(Continued)

FOREIGN PATENT DOCUMENTS

EP 0251446 A2 1/1988
EP 0525610 A2 2/1993
(Continued)

OTHER PUBLICATIONS

Extended European Search Report issued by the European Patent Office on Nov. 5, 2021 in corresponding EP Patent Application No. 21173811.7.
(Continued)

*Primary Examiner* — Bryon P Gehman
(74) *Attorney, Agent, or Firm* — Carter, DeLuca & Farrell, LLP; George Likourezos; Bret P. Shapiro

(57) ABSTRACT

A package including at least one layer of biodegradable material and containing a plurality of unit dose products, at least one unit dose product including a detergent composition within a sealed compartment formed by a water soluble film, the film being printed on an inner surface, facing the detergent composition.

10 Claims, 2 Drawing Sheets

(51) Int. Cl.
*B65D 50/04* (2006.01)
*B65D 85/00* (2006.01)
*C11D 17/04* (2006.01)

(58) Field of Classification Search
CPC .......... B65D 85/70; B65D 25/14; C11D 1/00; C11D 17/04; C11D 17/042; C11D 17/043; C11D 17/041
USPC ........................................................ 206/524.7
See application file for complete search history.

(56) References Cited

U.S. PATENT DOCUMENTS

| | | | | |
|---|---|---|---|---|
| 9,457,944 | B2 * | 10/2016 | Meier | B65D 65/46 |
| 9,988,595 | B2 * | 6/2018 | Brandt-Sanz | C11D 17/042 |
| 10,336,973 | B2 * | 7/2019 | Labeque | C11D 17/042 |
| 10,526,479 | B2 * | 1/2020 | Friedrich | C11D 17/042 |
| 10,633,617 | B2 * | 4/2020 | Miracle | C11D 17/042 |
| 12,146,267 | B2 * | 11/2024 | Cartier | B65D 65/466 |
| 2003/0222130 | A1 | 12/2003 | Fukushima et al. | |
| 2006/0151584 | A1 * | 7/2006 | Wonnacott | B65D 5/68 229/119 |
| 2009/0250370 | A1 * | 10/2009 | Whitchurch | B29C 48/18 206/524.2 |
| 2015/0158645 | A1 * | 6/2015 | Meier | C11D 17/042 206/524.7 |
| 2015/0275153 | A1 * | 10/2015 | Murphy | B65D 65/46 206/524.7 |
| 2016/0355766 | A1 * | 12/2016 | Brooker | C11D 17/043 |
| 2017/0298216 | A1 | 10/2017 | Labeque et al. | |
| 2018/0002647 | A1 | 1/2018 | Souter et al. | |
| 2021/0047072 | A1 | 2/2021 | Ng Pak Leung et al. | |

FOREIGN PATENT DOCUMENTS

| | | | |
|---|---|---|---|
| EP | 3101106 | A1 | 12/2016 |
| EP | 3205599 | A1 | 8/2017 |
| EP | 3205601 | A1 | 8/2017 |
| EP | 3205602 | A1 | 8/2017 |
| EP | 3205765 | A1 | 8/2017 |
| EP | 3138896 | A1 | 3/2018 |
| EP | 3754003 | A1 | 12/2020 |
| EP | 3778412 | A1 | 2/2021 |
| WO | 91/00345 | A1 | 1/1991 |
| WO | 94/02618 | A1 | 2/1994 |
| WO | 02/20361 | A1 | 3/2002 |
| WO | 2016/172088 | A1 | 10/2016 |
| WO | 2016/198978 | A1 | 12/2016 |
| WO | 2018/069413 | A1 | 4/2018 |

OTHER PUBLICATIONS

International Search Report and Written Opinion issued in corresponding International Application No. PCT/EP2022/061818 dated Sep. 2, 2022, pp. 1-10.

International Preliminary Report on Patentability issued in corresponding International Application No. PCT/EP2022/061818 dated Jul. 13, 2023, pp. 1-11.

* cited by examiner

PACKAGE CONTAINING WATER-SOLUBLE CAPSULES

This invention relates to a product comprising bulk quantities of laundry or machine dish wash water-soluble capsules made from water-soluble film, contained in biodegradable packaging.

WO 02/20361 discloses an article of manufacture or package for containing and dispensing unitized doses of a laundry additive in article form. The package comprises a plurality of laundry additive articles, means for preventing exposure of the laundry articles to moisture prior to dispensing or use, and a container having a compartment and closure for enclosing the plurality of articles in the container. The container can be a tub, tray, jar, bottle, pouch, bag, box or some combination thereof and will preferably be made from polymeric materials. Optionally, the container may have dividing means for subdividing the container compartment into subcompartments so that the container can accommodate a variety of different additives in separate compartments. Optionally, but preferably, the container closure will have child resistant features as well as a window or other means for viewing the contents of the package when the closure is in a closed position. The means for preventing exposure of the articles to moisture may simply be a seal about the container closure or it may comprise separate a seal for each laundry additive article. Seals for the individual articles will preferably be a tray with a recess formed therein for receiving the laundry additive article and a polymeric film adhered to the tray over the recess to seal the article within.

WO 2016/198978 discloses a child-proof container comprising: a housing made of sheet material defining an inner volume and exhibiting a passage opening delimited by a free edge, a closing system made of sheet material configured for defining a closed and opened conditions of the housing, the closing system comprises a tab having a closing portion movable with respect to the housing free edge. The container comprises a safety device made of sheet material exhibiting: a first hooking portion carried by the tab, a second hooking portion engaged with the housing. The first and second hooking portions are configured for stably engaging with each other in the closed condition of the closing system and for defining a safety condition: the first and second hooking portions, in the safety condition, are configured for preventing the closing system from switching from the closed to the opened condition.

Water soluble capsules are highly convenient, however, certain compositions are required to have printing thereon to indicate directions and other information to the consumer.

It is also desirable to limit access to the capsules particularly with respect to children, by incorporating child resistant features into the packaging. Current capsules are generally packaged in plastic tubs or plastic bags. It is impervious to water and the contained formulations. Rigid packaging may currently be recycled, however there is an environmental need to reduce the use of plastic. Compostable or biodegradable material offers environmental advantages, however due to its very nature (is tendency to biodegrade) the use of such materials is problematic. If capsules leak from e.g. an imperfect seal, the packaging can become weakened by premature degradation of the biodegradable material if this comes into direct contact with leaked formulation. The mechanical properties of the pack are compromised. Under the weight of bulk quantities of capsules, and the likely egress of moisture from the capsules, the integrity of any child resistant closures can be compromised. The pack may thus become more easily accessible to children which is undesirable.

Further, whereas plastic containers are typically sealed tightly and so exhibit very low moisture vapour transmission rates pulp or fibrous containers are prone to high water transmission properties. This means that that the likelihood of water ingress and/or egress is much higher and so there is an impact on the physical performance of the unit dosed products inside such a fibre or pulp based container. A particular characteristic is that unit dose products containing detergent compositions having from 5 to 15% water tend to stick to the inside surface of such containers on storage. This sticking is caused by the exterior surface being negatively affected by the water transmission when stored in a paper-based container. By printing on the inside we have found that this characteristic is markedly reduced. That the location of the print is instrumental in the performance of a unit dosed product in a biodegradable pack such as pulp or fibre is unexpected but welcome.

Accordingly, and in a first aspect there is provided a substrate treatment product comprising a package comprising at least one layer of biodegradable material, the packaging containing a plurality of unit dose products, at least one unit dose product comprising a detergent composition within a sealed compartment formed by a water soluble film, said film being printed on an inner surface.

We have surprisingly found that it is possible to provide a commercially viable package for a unit dose product and which has the required biodegradability profile without deleterious water-transmission. This is particularly relevant when considering printed capsules where we have found that printing on the inside of the capsule leads to improved product performance.

As used throughout this specification including the claims, the following terms are defined: articles “a” and “an” when used in a claim, are understood to mean one or more of what is claimed or described.

- “ambient-active” in the context of enzymatic compositions, is intended to mean active at temperature no more than 40° C., preferably no more than 30° C., more preferably no more than 25° C. most preferably no more than 15° C. but always greater than 1 degree Celcius and “active” means effective in achieving stain removal, also defined herein.
- “Biodegradable” means the complete breakdown of a substance by microorganisms to carbon dioxide water biomass, and inorganic materials.
- “Child resistant closure mechanism” refers to any mechanism whereby access to the water soluble capsules is reduced so that the water soluble cannot be readily removed, by infants and children. This preferably comprises any suitable arrangement that requires individuals to perform multiple cognitive and manipulative steps to open so as to prevent a child from inadvertently accessing the capsules.
- “Compostable” means a material that meets the following three requirements: (1) is capable of being processed in a composting facility for solid waste; (2) if so processed will end up in the final compost; and (3) if the compost is used in the soil the material will ultimately biodegrade in the soil.
- “Enzyme” includes enzyme variants (produced, for example, by recombinant techniques). Examples of such enzyme variants are disclosed, e.g., in EP 251,446 (Genencor), WO 91/00345 (Novo Nordisk), EP 525, 610 (Solvay) and WO 94/02618 (Gist-Brocades NV).

"Essentially free of a component" means that no amount of that component is deliberately incorporated into the composition.

"Film" refers to a water soluble material and may be be sheet-like material. The length and width of the material may far exceed the thickness of the material, however the film may be of any thickness.

"Renewable" refers to a material that can be produced or is derivable from a natural source which is periodically (e.g., annually or perennially) replenished through the actions of plants of terrestrial, aquatic or oceanic ecosystems (e.g., agricultural crops, edible and non-edible grasses, forest products, seaweed, or algae), or microorganisms (e.g., bacteria, fungi, or yeast).

"Renewable resource" refers to a natural resource that can be replenished within a 100 year time frame. The resource may be replenished naturally, or via agricultural techniques. Renewable resources include plants, animals, fish, bacteria, fungi, and forestry products. They may be naturally occurring, hybrids, or genetically engineered organisms. Natural resources such as crude oil, coal, and peat which take longer than 100 years to form are not considered to be renewable resources.

"Thermoforming" means a process in which the film is deformed by heat, and in particular it may involve the following: a first sheet of film is subjected to a moulding process to form an enclosure in the film e.g. forming a recess in the film. Preferably this involves heating prior to deformation. The deformation step is preferably enabled by laying the film over a cavity and applying a vacuum or an under pressure inside the cavity (to hold the film in the cavity). The recesses may then be filled. The process may then include overlaying a second sheet over the filled recesses and sealing it to the first sheet of film around the edges of the recesses to form a flat sealing web, thus forming a capsule which may be a unit dose product. The second film may be thermoformed during manufacture. Alternatively the second film may not be thermoformed during manufacture. Preferably, the first water-soluble film is thermoformed during manufacture of the unit dose article and the second water-soluble film is not thermoformed during manufacture of the unit dose article.

"Unit dose" means an amount of composition suitable to treat one load of laundry, such as, for example, from about 0.05 g to about 100 g, or from 10 g to about 60 g, or from about 20 g to about 40 g.

"Water-soluble" means the article (film or package) dissolves in water at 20° C.

Unless otherwise noted, all component or composition levels are in reference to the active portion of that component or composition, and are exclusive of impurities, for example, residual solvents or by-products, which may be present in commercially available sources of such components or compositions.

Except in the examples and comparative experiments, or where otherwise explicitly indicated, all numbers are to be understood as modified by the word "about".

All percentages (expressed as "%") and ratios contained herein are calculated by weight unless otherwise indicated. All conditions herein are at 20° C. and under the atmospheric pressure, unless otherwise specifically stated. All polymer molecular weights are determined by weight average number molecular weight unless otherwise specifically noted.

Numerical ranges expressed in the format "from x to y" are understood to include x and y. When for a specific feature multiple preferred ranges are described in the format "from x to y", it is understood that all ranges combining the different endpoints are also contemplated. In specifying any range of values or amounts, any particular upper value or amount can be associated with any particular lower value or amount.

The Package Material

The package comprises a biodegradable material. The biodegradable material may comprise a biodegradable polymer. The packaging may comprise entirely biodegradable material such that the package in its entirety can be completely broken down of a substance by microorganisms such as bacteria, fungi, yeasts, and algae; environmental heat, moisture, or other environmental factors to carbon dioxide water biomass, and inorganic material. Preferably from 90-99.9% wt. of the container, more preferably from 96-99.9% wt. consists of pulp or fibrous materials such as paper, card or board. The remainder comprising barrier materials and/or information labels. However, it is preferred that any label also comprises biodegradable materials as described herein preferably paper or other fibrous or pulp based material.

If desired, the extent of biodegradability may be determined according to e.g. ASTM Test Method 5338.92.

Suitable biodegradable materials comprises paper, card or board from cellulose or derivatives; and may optionally comprise lignin or derivatives; biodegradable plastics, such as bioplastics which are preferably oxo-biodegradable plastics wherein biodegradation results from oxidative and cell-mediated phenomena, either simultaneously or successively (as distinct from oxo-degradation which is degradation resulting from "oxidative cleavage of macromolecules" such that the plastic fragments but does not biodegrade except over a very long time). The material may also be compostable.

The biodegradable material comprises a bio polymer such as polylactic acid (PLA) which may be from e.g. corn starch, cassava, sugarcane etc; polyhydroxyalkanoate (PHA) including include poly-3-hydroxybutyrate (PHB or PH3B), polyhydroxyvalerate (PHV), and polyhydroxyhexanoate (PHH). A PHA copolymer called poly(3-hydroxybutyrate-co-3-hydroxyvalerate) (PHBV); biodegradable polyesters e.g. polycaprolactone (PCL), Polybutylensuccinat (PBS) polyvinylalcohol (PVA); polybutylenadipate-terephthalate (PBAT); cellulose based materials e.g. ethyl cellulose, cellulose acetate (true) Cellophane (made from wood, cotton or hemp); starch or starch based materials (from potato, rice, corn etc); sugar cane bagasse, and any combination or mixture thereof. For example PCL may be mixed with starch to improve biodegradability of the PCL.

The biodegradable material may comprise any biodegradable polyolefin.

Biodegradable petroleum based plastics include: polyglycolic acid (PGA), a thermoplastic polymer and an aliphatic polyester; polybutylene succinate (PBS), which is a thermoplastic polymer resin that has properties comparable to propylene; polycaprolactone (PCL), as this has hydrolysable ester linkages offering biodegradable properties. It has been shown that firmicutes and proteobacteria can degrade PCL. *Penicillium* sp. strain 26-1 can degrade high density PCL; though not as quickly as thermotolerant *Aspergillus* sp. strain ST-01. Species of *clostridium* can degrade PCL under anaerobic conditions; Polybutylene adipate terephthalate (PBAT) which is a biodegradable random copolymer.

The most preferred biodegradable materials include paper, card or board from cellulose or derivatives.

Preferably the biodegradable material is bio-based according to $^{14}C$ or radiocarbon method (EU: EN 16640 or CEN/TS 16137, International: ISO 16620-2, US: ASTM 6866). Preferably the biodegradable material is made from a renewable resource.

The packaging material may comprise an outer layer to provide additional protection or sheen (for biodegradable materials with a matt finish such as paper board). This layer preferably comprises a biodegradable polymer coating or varnish or film. Preferably the outer layer comprises any of the bio polymers described above. Preferably the outer layer is at least present on some or all of the internal surfaces of the receptable.

The term fibrous or pulp material includes paper or paperboard: specifically. Preferably, the fibrous or pulp material is in the form of a sheet and is formed as a blank which is folded to form a closeable container. The closeable container can be formed from a one-piece blank or may contain multiple pieces.

The material useable for making the container can exhibit a grammage from 100 and 500 g/m$^2$, preferably from 200 and 400 g/m$^2$. The sheet paper material used for making the container can, in an embodiment variant thereof, be covered, for at least part of the first and/or second prevalent development surfaces, by a coating, for example a film, whose aim is to balance water transfer between the interior and the exterior of the container with leakage protection. Advantageously but not in a limiting way, the coating could comprise and extrusion coating on one or both sides (inner side and/or outer side) of the paper material defining the container, with values which can for example range between 10 and 50 micrometer of the coating material. The coating plastic material can be for example selected among the following materials: LDPE, HDPE, PP, PE.

Preferred barrier materials include polymeric materials selected from polylactic acid, polyhydroxyalkanoate, a polyester, polybutylenadipate terephthalate, a cellulose based material, a starch based material, a sugar cane based material and mixtures thereof.

In a preferred embodiment the biodegradable material comprises at least two layers, more preferably at least three.

The biodegradable material preferably comprises a bleached layer and which bleached layer comprises an outer layer of the biodegradable material. By outer layer is meant that the bleached layer is physically outermost. A second layer comprises a non-bleached layer which is also exterior but opposite the bleached layer. The biodegradable material thus preferably comprises a bleached and un-bleached layer on opposing sides. Between the bleached and unbleached layer is preferably a filler layer comprised of post-consumer recycled material and which is preferably paper-based also.

Cellulose Fibre Length

Preferably, the biodegradable material used in the present invention is paper-based. By paper-based is meant that it derives from cellulose-containing natural sources such as trees. The physical properties of the paper, or pulp-based product depend largely on the nature of the cellulose fibres which are separated from lignin during processing. This may be influenced by the cellulose source, i.e. which type of tree is the original source, and also what processing has been carried out. There is a common tendency to characterise paper as being either recycled or virgin, non-recycled, however, this is misleading since it is the physicality of the cellulose fibre which is key to its performance in the context of this invention. For example, hardwood fibres are typically good for smoothness and formation and have short fibres. Typical hardwood sources include *eucalyptus*, birch, maple, beech and oak. In contrast softwood fibres are good for strength and stiffness and include those sourced from pine, spruce and fir.

Accordingly, where the at least one layer of biodegradable material is paper-based, it is preferred that the weight average fibre length of the cellulose in the paper is at least 2 mm, more preferably from 3 to 5 mm.

Cellulose fibre length is characterised according to the test referred to by TAPPI (Technical Association of the Pulp and Paper Industry) as T 271 om-18 which is a method designed to measure the fibre length of pulp and paper by automated optical analyser using polarised light. The test is an Approved Americal National Standard (ANSI).

Where the package comprises co-operating base and lid members it is preferred that the base contains a paper-based layer with a weight average fibre length of at least 2 mm, more preferably from 3 to 5 mm. We have surprisingly found that this superior fibre length provides improved performance when the package is designed for storing liquid detergent capsules, particularly in the context of water containment in the event of leaking. This is particularly important when the package design is required to have child safety features since poor water containment may lead to package weakness and hence easier access to contents.

Where the package comprises a separate lid part, it is preferred that the lid comprises paper with a weight average cellulose fibre length of from 1 to 5 mm.

In a preferred embodiment, the lid comprises from 80%, more preferably from 95% wt. of the lid paper with a weight average cellulose fibre length of from 1 to 5 mm.

In a preferred embodiment, the base comprises from 80%, more preferably from 95% wt. of the base paper with a weight average cellulose fibre length of at least 2 mm.

Printing

The unit dosed product is printed to provide useful information to the consumer. The printing is essentially on an interior of the capsule or product when formed. Typically, the printing is carried out on a roll of film before the product is manufactured and such that the printed surface is the surface which faces the detergent composition when the final product is formed.

The area of print may cover the entire film or part thereof. The area of print may comprise a single colour or maybe comprise multiple colours, even three colours. The area of print may comprise white, black and red colours. The area of print may comprise pigments, dyes, bluing agents or mixtures thereof. The print may be present as a layer on the surface of the film or may at least partially penetrate into the film. The area of print may be present on the outside of the unit dose article in addition to the inner surface of the film, i.e. in contact with the liquid laundry detergent composition.

Preferably, the film comprises a phthalocyanine based pigment. Such a pigment is used to print on to the film. A preferred pigment includes SpectraRAY® F UVDB354 commercially available from Sun Chemical and is a phthalocyanine based pigment. It is referred to as CAS 147-14-8.

The unit dose article may comprise at least two films, or even at least three films, wherein the films are sealed together. The area of print may be present on one film, or on more than film, e.g. on two films, or even on three films.

The area of print may be achieved using standard techniques, such as flexographic printing or inkjet printing. Preferably, the area of print is achieved via flexographic printing, in which a film is printed, then moulded into a unit dose article.

The packaging containing a plurality of water-soluble capsules, each water-soluble capsule comprising a detergent composition within a sealed compartment which is preferably filled to at least 60% of the volume of the compartment.

Preferably, the container comprises 10 or more of said unit dosed products and a closure.

With this arrangement, water soluble capsules with performance levels of substrate treatment liquid can be filled at speed and packaged in large quantities to reduce manufacturing costs but can be packaged using biodegradable materials and still minimizing deleterious effects leaking capsules. This is surprising considering the similarity in the compositions forming the capsule film and also the polymers used in the biodegradable packaging.

The selected range of viscosity is ensures filling times do not slow manufacturing times so as to render the capsules too costly. At the same time, the applicants have found if the liquid is thickened to a viscosity as specified in the first aspect of the invention, this minimizes splashing of the capsule seal areas and also minimizes the formation of waves (in the formulation) which might also affect the seal integrity, as the capsules are filled at high speed.

The Packaging

The packaging preferably has a minimum compression strength of 300N. The thickness (or caliper) of material will be chosen to provide the necessary structural rigidity to the package.

The packaging may comprise any suitable rigid structure, such as a tub or carton or box, tubular structure, or bottle. However, preferred containers will be formed from a blank which is formed into a container. Preferably, the container will comprise a base, opposing pairs of walls and a closable lid. Preferably, the lid is integral with the base or formed from a separate component.

The walls of such structures may be foamed, moulded. It may comprise laminate structures (e.g. built up in layers). It may comprise fibrous material such as fibres/pulp which is glued, compressed and/or enclosed in stiff walls. Fluting may be incorporated e.g. corrugated paper board. For paperboard, the grammage is preferably at least 200 gsm (grams per square meter) preferably at least 225 gsm.

The structure may be foldable between an erected structure to provide a functioning receptacle and a flattened structure which assists in transportation and ease of disposal later so that multiple packs could be flattened and stacked ready for transport to a biodegradation site.

The biodegradable packaging may comprise a combination of a fibrous and/or pulp material and a polymeric material. One example may be a material comprises one or more fibrous and/or pulp layers in combination with one or more polymeric materials (all materials being biodegradable). There may be one or more layers of fibre and/or pulp sandwiched between layers of polymeric material. The material may be virgin or recycled.

Dimensionally, it is preferred that the container comprises a top surface which, when in a closed configuration, is from 9 to 15 cm wide. This width is an average across the full length of the top surface. This width is preferred because the biodegradable packaging tends to flex more easily than the more rigid plastic packaging containers and we have found that this dimension correlates with the optimal consumer behaviour when opening the container to access the contents by using appropriate force and so not damaging the biodegradable container or the contents within. This is particular the case when the child resistant closure requires simultaneous pressing of unlocking zones on opposing side walls. Such opposing pressures may damage the contents of the container by pressurising capsules which are already under water transmission stress.

Where the package comprises a separate lid and base it is preferred that the lid comprises a top sheet and depending pairs of opposing walls such that it resembles five sides of a cube. Similarly, it is preferred that the base comprises a bottom sheet and upstanding pairs of opposing walls such that it also resembles five sides of a cube.

In this way, the lid and the base co-operate to form a closed container with the pairs of opposing walls for each of the lid and the base providing double protection against the exterior as the lid and base co-operate telescopically. Preferably, the lid provides the outermost surface when the base and lid are telescopically engaged to close the package.

Preferably, the lid comprises a bleached layer on the outermost layer and an unbleached layer on the innermost layer. In such a configuration the bleached layer presents the outermost surface of the package for the five sides that the lid makes up. Preferably, this outermost layer comprises printed parts.

Preferably, the bleached layer also comprises a barrier material as described below. More preferably, the innermost surface comprises an unbleached layer and most preferably is not treated with a barrier material.

Preferably, the base comprises a bleached layer on the innermost layer and an unbleached layer on the outermost layer. In such a configuration the bleached layer presents the innermost surface of the package for the five sides that the base makes up. Such an innermost layer is physically in contact with at least some of the laundry unit dosed products.

Preferably, the bleached layer also comprises a barrier material as described below. More preferably, the innermost surface of the base comprises an unbleached layer and most preferably is also treated with a barrier material.

In an alternative embodiment the container comprises a containing drawer which is open at the top permitting access to the contents of the container, and which is slidable engagable with an exterior case which closes access when the drawer is fully engaged within the case. In such an embodiment the case would correspond to the lid described above and the drawer to the base.

Barrier Materials

The paper-based packaging comprises a barrier material for improved performance. Barrier materials are preferably employed to provide humidity control and are usually applied on the board surface on one or both sides, depending on the end use.

Dispersion Barrier

Dispersion is a new barrier option without the traditional coating layers. The surface is finished with water-based dispersion technology. That makes the board liquid and grease resistant during its use while it breaks down in a recycling process like paper, providing high yield of recovered fiber when products are recycled.

Green PE Coating

PE Green is a fully renewable option to traditional PE (polyethylene) and provides excellent humidity protection. PE Green is made of renewable, plant-based raw material, so you get a barrier packaging that is 100% renewable as well as recyclable. In converting, it performs the same way as PE and is therefore easy to introduce to production by customers.

PE Coating

PE, or polyethylene, is the most commonly used barrier coating. Polyolefin barriers, such as LDPE and HDPE polymers, provide excellent humidity protection.

Biodegradable Coating

Biodegradable coatings are tailor-made polymers offering humidity, oxygen and grease barriers and sealability. Our biodegradable coatings are compostable. However, the biopolymer-coated paperboard can be easily recycled, too, which is usually the preferred end-of-life option.

Biopolymers can be produced from natural crops or from fossil raw materials. But the key is that in the end the biopolymer-coated paperboard breaks down to humus and CO2. If you choose our biopolymer-coated paperboard, you get a product that is recyclable or it can be collected among other compostable waste that goes into industrial composting.

PET Coating

PET provides a barrier and performs other functions. Black or white PET coatings that provide heat resistance act as an excellent grease barrier and possess solid WVTR (water vapour transmission rate) properties.

PP Coating

PP or polypropylene coating offers heat resistance for microwave oven and is also suitable for deep freezing. Good sealing properties secure performance in use.

However, it is preferred that the barrier material comprises less than 5% wt. more preferably less than 1% and preferably substantially zero PE, PP or PET.

In a preferred embodiment the barrier comprises a water-based dispersion.

Water-based barrier coatings seal the substrate surface and protect the packaging from external and internal influences. The packaging remains attractive and can fulfil its functionality without restrictions. Depending on the product, our barrier coatings offer adequate protection against fat, water, water vapor, dairy products, alcohol, oil or alkali for the lifetime of the packaging. Due to their versatility, they are used for a wide range of applications. Barrier coatings are available for packaging converters and printers or the paper industry.

Preferably, the base of the package comprises a layer of water-based dispersion barrier. Preferably, the barrier material on the base is applied to an inner surface Preferably, the lid component comprises less than 1% wt. of the barrier material, more preferably a water-based dispersion barrier.

More preferably, the dispersion barrier component comprises a thermoplastic elastomer (TPE). Said TPE is preferably dispersed in the barrier component.

The advantage of a TPE containing barrier material is that it is dispersed in the barrier component such that layers are not required. The dispersion is applied in one go. An alternative barrier component may comprise a multi-layer approach. Such barriers include those commercially available from Weilburger under the Senolith® brand. Examples are described in WO 2018/069413. Preferably, these would be applied by digital print, ink duct damping unit, flexo printing, inline-offline coating unit, and web offset as well as gravure.

Such barrier materials might be applied as a wet layer primarily. The dispersion is preferably an aqueous dispersion, in particular a PTFE dispersion, perfluoroalkoxy (PFA) polymer dispersion, and/or fluorinated ethylene-propylene (FEP), copolymer of hexafluoropropylene.

When a layer is applied in a moist form, a surface film is formed which can then be cured. A first layer can have a resin in order to improve adhesion to a substrate. Exemplary suitable resins are, without limitation, polyamideimide, polyphenylene sulfide (PPS), polyether sulfone (PES), polyether ether ketone (PEEK), silicone resin and/or polysulfone. The proportion of such a resin in a moist composition to be applied as a layer, in particular a dispersion, is preferably about 3 to 8 percent by weight of the composition.

The second polymer is applied to the first layer in a liquid. The dispersion can contain further constituents mentioned herein. The dispersion is preferably an aqueous dispersion, in particular a PTFE dispersion, perfluoroalkoxy (PFA) polymer dispersion, and/or fluorinated ethylene-propylene (FEP, copolymer of hexafluoropropylene and tetrafluoroethylene) dispersion. The proportion of the second polymer in a moist composition to be applied as a layer, in particular a dispersion, is preferably about 40-60 percent by weight. The first layer may have been dried, partially dried or not dried prior to application of the second layer. In an advantageous variant, the second layer is applied to the first layer as long as the first layer is still moist, in particular as long as the first layer is still moist.

Preferably, both the lid and the base comprise multi-layer barrier material such as those described above.

Preferably, the barrier material is applied to the exterior of lid and/or base. More preferably, the barrier material is applied to at least 50%, more preferably, from 70%, especially preferably from 90% and most preferably from 95% of the exterior surface of the lid.

More preferably, the barrier material is applied to at least 50%, more preferably, from 70%, especially preferably from 90% and most preferably from 95% of the exterior surface of the base.

More preferably, the base comprises barrier material on the exterior and the interior surface.

Adhesive

Preferably, the packaging is folded into shape and maintained in shape with the help of adhesives. Adhesives are common in the art but preferably we mean hot melt adhesive, reactive hot melt adhesive, thermosetting adhesive, pressure sensitive adhesive, contact glue adhesive. Preferably, the adhesive is a hot melt pressure sensitive adhesive.

Preferably, the hot melt pressure sensitive adhesive is suitable to tackify and bond to a range of materials making up the packaging.

Total Content

Preferably, the barrier material and adhesive comprises from 0.1 to 5% wt. of the total package plus adhesive and barrier material. More preferably, the barrier material and adhesive comprises from 1 to 3% wt. and most preferably from 1.5 to 2.5% wt. of the total package plus adhesive and barrier material.

Preferably, the barrier material and adhesive comprises from 0.1 to 5% wt. of the lid plus adhesive and barrier material. More preferably, the barrier material and adhesive comprises from 1 to 3% wt. and most preferably from 0.9 to 1.4% wt. of the lid plus adhesive and barrier material.

Preferably, the barrier material and adhesive comprises from 0.1 to 5% wt. of the base plus adhesive and barrier material. More preferably, the barrier material and adhesive comprises from 1 to 3% wt. and most preferably from 1.5 to 2.6% wt. of the base plus adhesive and barrier material.

Preferably, the barrier material comprises from 0.1 to 5% wt. of the total package plus barrier material and adhesive. More preferably, the barrier material comprises from 1 to 3% wt. and most preferably from 1.5 to 2.5% wt. of the total package plus barrier material and adhesive.

Preferably, the barrier material comprises from 0.1 to 5% wt. of the lid plus barrier material and adhesive. More preferably, the barrier material comprises from 1 to 3% wt. and most preferably from 1.4 to 2.2% wt. of the lid plus barrier material and adhesive.

Preferably, the barrier material comprises from 0.1 to 5% wt. of the base plus barrier material and adhesive. More preferably, the barrier material comprises from 0.3 to 3% wt. and most preferably from 0.5 to 1.5% wt. of the base plus barrier material and adhesive.

Preferably, the adhesive comprises from 0.1 to 5% wt. of the total package plus adhesive and the barrier material. More preferably, the adhesive comprises from 1 to 3% wt. and most preferably from 1.5 to 2.5% wt. of the total package plus adhesive and the barrier material.

Preferably, the adhesive comprises from 0.1 to 5% wt. of the lid plus adhesive and the barrier material. More preferably, the adhesive comprises from 1 to 3% wt. and most preferably from 1.2 to 2.1% wt. of the lid plus adhesive and the barrier material.

Preferably, the adhesive comprises from 0.1 to 5% wt. of the base plus adhesive and the barrier material. More preferably, the adhesive comprises from 1 to 3% wt. and most preferably from 1.5 to 2.6% wt. of the base plus adhesive and the barrier material. Preferably, the lid plus base comprises from 0 to 5% wt. polyolefin selected from PP, PE and PET. More preferably, the base plus lid comprises from 0 to 1% and most preferably zero PP, PE and PET.

The lid having a bleached outersurface and the base having a bleached inner surface means that the two unbleached surfaces are in contact with one another when the lid and base are cooperatively engaged. This facilitates sliding between the two, particularly in humid environments.

COBB Values

The COBB test (T441 om-20, TAPPI) measures water absorptiveness of sized and corrugated fiberboard. The 'Cobb value' is the mass of water absorbed in a specific time by 1 $m^2$ of substrate under 1 cm of water.

Preferably, the Cobb60 for the lid without barrier materials added is from 5 to 80 $g/m^2$, more preferably from 6 to 50 $g/m^2$ for the bleached surface and is from 5 to 100 $g/m^2$, more preferably from 10 to 30 $g/m^2$ for the unbleached surface.

Preferably, the Cobb60 for the lid with barrier materials added is from 0.1 to 1.5 $g/m^2$, more preferably from 0.3 to 1.0 $g/m^2$ for the bleached surface.

Preferably, the Cobb1800 for the lid without barrier materials added is from 80 to 200 $g/m^2$, more preferably from 90 to 150 $g/m^2$ for the bleached surface and is from 8 to 200 $g/m^2$, more preferably from 100 to 130 $g/m^2$ for the unbleached surface.

Preferably, the Cobb1800 for the lid with barrier materials added is from 80 to 200 $g/m^2$, more preferably from 90 to 150 $g/m^2$ for the bleached surface.

Preferably, the Cobb60 for the base without barrier materials added is from 0.5 to 15 $g/m^2$, more preferably from 1 to 10 $g/m^2$ for the bleached surface and is from 5 to 80 $g/m^2$, more preferably from 10 to 30 $g/m^2$ for the unbleached surface.

Preferably, the Cobb60 for the base with barrier materials added is from 0.1 to 1.5 $g/m^2$, more preferably from 0.3 to 1.0 $g/m^2$ for the bleached surface.

Preferably, the Cobb1800 for the base without barrier materials added is from 80 to 200 $g/m^2$, more preferably from 90 to 150 $g/m^2$ for the bleached surface and is from 8 to 200 $g/m^2$, more preferably from 80 to 120 $g/m^2$ for the unbleached surface.

Preferably, the Cobb1800 for the base with barrier materials added is from 0.5 to 20 $g/m^2$, more preferably from 2 to 15 $g/m^2$ for the bleached surface.

We have surprisingly found that this superior fibre length provides improved performance when the package is designed for storing liquid detergent capsules, particularly in the context of water containment in the event of leaking. This is particularly important when the package design is required to have child safety features since poor water containment may lead to package weakness and hence easier access to contents.

Preferably the width of the cartonboard for both lid and base is from 200 to 800 micrometers.

Preferably, the container comprises an absorbent pad. Preferably, such an absorbent pad is placed at the bottom of the package in the base and before the unit dose articles are placed inside the package.

The Child Resistant Closure

The invention includes a child resistant closure mechanism comprising a first locking member on the receptacle and a second locking member present on the closure whereby the members interlock.

The child resistant closure is obtained by specific structures to secure the closure in place (closing the receptacle) until a specific operation is carried out to disengage the closure.

Closures may include tops and lids with respective locking members that must be lined up in a certain orientation before they will release from locking members on the receptacle, or that require the performance of a certain sequence of steps or actions to actuate their release as described below.

The receptacle and closure may each incorporate at least one, and preferably at least two such locking members, and the package closed by the locking of multiple pairs of locking members, each pair comprising one locking member on the closure inter-engaging with one locking member from the receptacle. Preferably each pair of locking members are operable independent of any at least one other pair of locking members, such that unlocking of one pair does not automatically unlock the other pair. Preferably, at least one pair are spaced apart from another pair at locations on the package, so for example, they may be located at diagonally opposed positions e.g. at or adjacent diagonally opposed edges/corners of a generally square/rectangular closure and/or at diametrically opposed positions on the edge of a circular closure.

Preferably the or each locking member comprises a resilient part so that it springs into and/or out of a locking engagement with a respective locking member.

Locking members may be selected from any projection and corresponding recess, catches, clips, latches, flaps, straps, hook and loop fasteners, ratchet arrangements or lugs (on screw-threads), sliding arrangements, buttons, pull-tabs, keys, magnets or other locking component. Locking members may be biased e.g. spring loaded in the locking position (engaged with a respective locking member) so that pressure must be used to release them from each other.

The receptacle and closure may be attached to each other by a hinge or they may slide relative to each other and may even be unitary (e.g. with a living hinge) so that the closure is integral with the receptacle. The invention is particular preferred for such arrangements as softening the receptacle may result in mis-shaping and place stresses on the closure.

The specific operation may comprise a double and/or coordinated action on the closure. Preferably the child resistant closure is comprises locking members requiring double and/or co-ordinated action to open said closure. So for example the action required may be press-and-turn or press-and-pull mechanisms as are known by the person skilled in the art. For example the closure may be opened only when the closure or a part thereof, is both squeezed (radially) and rotated, or pushed (axially of the package) and rotated.

Child resistant closures may comprise gripping or squeezing both sides of the closure and rotating at the same time to remove the closure. The closure may be retained on the receptable by respective internal threads carrying ratchets or wedge shaped lugs as locking members, and prevent the closure from being unscrewed from the neck opening unless the closure and/or neck is flexed diametrically whereby the locking members move apart in a radial direction and allow the closure being unscrewed.

Locking members may require a double and/or coordinated action to be unlocked. For example the packaging for example, press and slide, or press and pull. A removable locking key may be required to lock and/or unlock said interlocking members.

The package may comprises a sliding mechanism whereby the closure or at part thereof slides relative to the receptable or the receptacle slides within a closure (e.g. as a tray pack arrangement whereby capsules are stacked on the tray part) and there is provided at least one locking mechanism configured to lock the inner sliding part relative to an outer part of the packaging. The locking mechanism may be biased so that pressure must be exerted to release the tray. In some implementations, the inner sleeve includes a pull tab for removal of the inner sleeve from inside the outer sleeve.

Locking members may be arranged spatially to prevent child access. For example at least 2 pairs may be separated from each other by a distance corresponding to the average span between a thumb and forefinger of the hand of an adult. Only when all both pairs are released simultaneously it is possible to open the lid of the packaging container.

For box constructions, preferably the locking members are located at diagonally opposed corners of the box.

The child resistant closure may produce audible feedback such as a ‘click’ to signal to the user that the closure is in place.

Tear-Resistant Part

Preferably the pack comprises a dimensionally stable tear-resistant planar material (e.g. laminate) such a dimensionally stable tear-resistant paperboard laminate for making a tear-resistant packaging structure. The dimensionally stable tear-resistant paperboard laminate may include includes a tear-resistant biodegradable polymer core layer having first and second opposite sides. The dimensionally stable tear-resistant paperboard laminate further includes a first paperboard layer bonded to the first side of said tear-resistant polymer core layer, with a first bonding medium. The dimensionally stable tear-resistant paperboard laminate further includes a second paperboard layer bonded to the second side of the tear-resistant polymer core layer, with a second bonding medium. The tear-resistant polymer core layer has a thickness of at least 1 mil and a tear resistance of at least 350 grams of force in machine direction and of at least 400 grams of force in cross direction, as measured by the Elmendorf tear propagation test, as measured by the Elmendorf tear propagation test. Moreover, the first and second paperboard layers are substantially structurally identical.

Preferably, the tear-resistant polymer core layer has a thickness of approximately 3 mils and a tear resistance of about 1700 grams of force in machine direction and about 400 grams of force in cross direction, as measured by the Elmendorf tear propagation test.

Unit Dosed Product

The preferred unit dose product, its constituent parts and its manufacturing method are all described in the literature, for example in WO 2015/153157 and WO 2018/086834. In detail, the water-soluble unit dose article comprises at least two water-soluble films and at least one internal compartment, wherein the compartment is enclosed by the films and has an internal space and wherein the compartment comprises a cleaning composition within the internal space.

Water-Soluble Film

The film of the unit dose article is soluble or dispersible in water, and preferably has a water-solubility of at least 50 percent, preferably at least 75 percent or even at least 95 percent, as measured by the method set out here after using a glass-filter with a maximum pore size of 20 microns:

50 grams plus or minus 0.1 gram of film material is added in a pre-weighed 400 ml beaker and 245 ml plus or minus 1 ml of distilled water is added. This is stirred vigorously on a magnetic stirrer set at 600 rpm, for 30 minutes. Then, the mixture is filtered through a folded qualitative sintered-glass filter with a pore size as defined above (max. 20 micron). The water is dried off from the collected filtrate by any conventional method, and the weight of the remaining material is determined (which is the dissolved or dispersed fraction). Then, the percentage solubility or dispersibility can be calculated.

Preferred film materials are preferably polymeric materials. The film material can, for example, be obtained by casting, blow-moulding, extrusion or blown extrusion of the polymeric material, as known in the art.

Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60 percent. The polymer can have any weight average molecular weight, preferably from about 1000 to 1,000,000, more preferably from about 10,000 to 300,000 yet more preferably from about 20,000 to 150,000.

Mixtures of polymers can also be used as the film material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35 percent by weight polylactide and about 65 percent to 99 percent by weight polyvinyl alcohol. Preferred for use herein are polymers which are from about 60 percent to about 98 percent hydrolysed, preferably about 80 percent to about 90 percent hydrolysed, to improve the dissolution characteristics of the material. Preferred film materials are polymeric materials. The film material can be obtained, for example, by casting, blow-moulding, extrusion or blown extrusion of the polymeric material, as known in the art. Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, for example a PVA polymer, is at least 60 percent. The polymer can have any weight average molecular weight, preferably from about 1000 to 1,000,000, more preferably from about 10,000 to 300,000 yet more preferably from about 20,000 to 150,000. Mixtures of polymers can also be used as the pouch material. This can be beneficial to control the mechanical and/or dissolution properties of the compartments or pouch, depending on the application thereof and the required needs. Suitable mixtures include for example mixtures wherein one polymer has a higher water-solubility than another polymer, and/or one polymer has a higher mechanical strength than another polymer. Also suitable are mixtures of polymers having different weight average molecular weights, for example a mixture of PVA or a copolymer thereof of a weight average molecular weight of about 10,000-40,000, preferably around 20,000, and of PVA or copolymer thereof, with a weight average molecular weight of about 100,000 to 300,000, preferably around 150,000. Also suitable herein are polymer blend compositions, for example comprising hydrolytically degradable and water-soluble polymer blends such as polylactide and polyvinyl alcohol, obtained by mixing polylactide and polyvinyl alcohol, typically comprising about 1-35 percent by weight polylactide and about 65 percent to 99 percent by weight polyvinyl alcohol. Preferred for use herein are polymers which are from about 60 percent to about 98 percent hydrolysed, preferably about 80 percent to about 90 percent hydrolysed, to improve the dissolution characteristics of the material. Preferred films exhibit good dissolution in cold water, meaning unheated water straight from the tap. Preferably such films exhibit good dissolution at temperatures below 25 degrees Centigrade, more preferably below 21 degrees Centigrade, more preferably below 15 degrees Centigrade By good dissolution it is meant that the film exhibits water-solubility of at least 50 percent, preferably at least 75 percent or even at least 95 percent, as measured by the method set out here after using a glass-filter with a maximum pore size of 20 microns, described above.

Preferred films are those supplied by Monosol under the trade references M8630, M8900, M8779, M8310.

Naturally, different film material and/or films of different thickness may be employed in making the compartments of the present invention. A benefit in selecting different films is that the resulting compartments may exhibit different solubility or release characteristics. The film material herein can also comprise one or more additive ingredients. For example, it can be beneficial to add plasticisers, for example glycerol, ethylene glycol, diethyleneglycol, propylene glycol, sorbitol and mixtures thereof. Other additives may include water and functional detergent additives, including water, to be delivered to the wash water, for example organic polymeric dispersants, etc.

The film may comprise an area of print. The area of print may cover the entire film or part thereof. The area of print may comprise a single colour or maybe comprise multiple colours, even three colours. The area of print may comprise pigments, dyes, bluing agents or mixtures thereof. The print may be present as a layer on the surface of the film or may at least partially penetrate into the film. The unit dose article may comprise at least two films, or even at least three films, wherein the films are sealed together. The area of print may be present on one film, or on more than film, e.g. on two films, or even on three films.

The area of print may be achieved using standard techniques, such as flexographic printing or inkjet printing. Preferably, the area of print is achieved via flexographic printing, in which a film is printed, then moulded into the shape of an open compartment. This compartment is then filled with a detergent composition and a second film placed over the compartment and sealed to the first film. The area of print may be on either side of the film.

The area of print may be purely aesthetic or may provide useful information to the consumer.

The area of print may be opaque, translucent or transparent.

Liquid Laundry Detergent Composition

The unit dose article or capsule comprises a liquid laundry detergent composition. The liquid composition may be opaque, transparent or translucent. Each compartment may comprise the same or a different composition. The unit dose article comprises a liquid composition, however, it may also comprise different compositions in different compartments. The composition may be any suitable composition. The composition may be in the form of a solid, a liquid, a dispersion, a gel, a paste, a fluid or a mixture thereof. The composition may be in different forms in the different compartments. Non-limiting examples of compositions include cleaning compositions, fabric care compositions, automatic dishwashing compositions and hard surface cleaners. More particularly, the compositions may be a laundry, fabric care or dish washing composition including, pre-treatment or soaking compositions and other rinse additive compositions. The laundry detergent composition may be used during the main wash process or could be used as pre-treatment or soaking compositions.

Laundry detergent compositions include fabric detergents, fabric softeners, 2-in-1 detergent and softening, pretreatment compositions and the like. Laundry detergent compositions may comprise surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments and mixtures thereof. The composition may be a laundry detergent composition comprising an ingredient selected from the group comprising a shading dye, surfactant, polymers, perfumes, encapsulated perfume materials, structurant and mixtures thereof.

The liquid laundry detergent composition may comprise an ingredient selected from, bleach, bleach catalyst, dye, hueing dye, cleaning polymers including alkoxylated polyamines and polyethyleneimines, soil release polymer, surfactant, solvent, dye transfer inhibitors, chelant, enzyme, perfume, encapsulated perfume, polycarboxylates, structurant and mixtures thereof.

Surfactants can be selected from anionic, cationic, zwitterionic, non-ionic, amphoteric or mixtures thereof. Preferably, the fabric care composition comprises anionic, non-ionic or mixtures thereof.

The anionic surfactant may be selected from linear alkyl benzene sulfonate, alkyl ethoxylate sulphate and combinations thereof.

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. In one aspect, $R^1$ is an alkyl group, which may be primary or secondary, that comprises from about 9 to 15 carbon atoms, or from about 10 to 14 carbon atoms. In one aspect, the alkoxylated fatty alcohols will also be ethoxylated materials that contain on average from about 2 to 12 ethylene oxide moieties per molecule, or from about 3 to 10 ethylene oxide moieties per molecule.

The shading dyes employed in the present laundry detergent compositions may comprise polymeric or non-polymeric dyes, pigments, or mixtures thereof. Preferably the shading dye comprises a polymeric dye, comprising a chromophore constituent and a polymeric constituent. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Although any suitable chromophore may be used, the dye chromophore is preferably selected from benzodifuranes, methine, triphenylmethanes, napthalimides, pyrazole, napthoquinone, anthraquinone, azo, oxazine, azine, xanthene, triphenodioxazine and phthalocyanine dye chromophores. Mono and di-azo dye chromophores are preferred. The shading dye may comprise a dye polymer comprising a chromophore covalently bound to one or more of at least three consecutive repeat units. It should be understood that the repeat units themselves do not need to comprise a chromophore. The dye polymer may comprise at least 5, or at least 10, or even at least 20 consecutive repeat units.

The repeat unit can be derived from an organic ester such as phenyl dicarboxylate in combination with an oxyalkyleneoxy and a polyoxyalkyleneoxy. Repeat units can be derived from alkenes, epoxides, aziridine, carbohydrate including the units that comprise modified celluloses such as hydroxyalkylcellulose; hydroxypropyl cellulose; hydroxypropyl methylcellulose; hydroxybutyl cellulose; and, hydroxybutyl methylcellulose or mixtures thereof. The repeat units may be derived from alkenes, or epoxides or mixtures thereof. The repeat units may be C2-C4 alkyleneoxy groups, sometimes called alkoxy groups, preferably derived from C2-C4 alkylene oxide. The repeat units may be C2-C4 alkoxy groups, preferably ethoxy groups.

For the purposes of the present invention, the at least three consecutive repeat units form a polymeric constituent. The polymeric constituent may be covalently bound to the chromophore group, directly or indirectly via a linking group. Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

The dye may be introduced into the detergent composition in the form of the unpurified mixture that is the direct result of an organic synthesis route. In addition to the dye polymer therefore, there may also be present minor amounts of un-reacted starting materials, products of side reactions and mixtures of the dye polymers comprising different chain lengths of the repeating units, as would be expected to result from any polymerisation step.

The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, beta-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

The laundry detergent compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1 percent to about 50 percent or even from about 0.1 percent to about 25 percent bleaching agent by weight of the subject cleaning composition.

The composition may comprise a brightener. Suitable brighteners are stilbenes, such as brightener 15. Other suitable brighteners are hydrophobic brighteners, and brightener 49. The brightener may be in micronized particulate form, having a weight average particle size in the range of from 3 to 30 micrometers, or from 3 micrometers to 20 micrometers, or from 3 to 10 micrometers. The brightener can be alpha or beta crystalline form.

The compositions herein may also optionally contain one or more copper, iron and/or manganese chelating agents. If utilized, chelating agents will generally comprise from about 0.1 percent by weight of the compositions herein to about 15 percent, or even from about 3.0 percent to about 15 percent by weight of the compositions herein.

The composition may comprise a calcium carbonate crystal growth inhibitor, such as one selected from the group consisting of: 1-hydroxyethanediphosphonic acid (HEDP) and salts thereof; N, N-dicarboxymethyl-2-aminopentane-1, 5-dioic acid and salts thereof; 2-phosphonobutane-1,2,4-tricarboxylic acid and salts thereof; and any combination thereof. The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001 percent, from about 0.01 percent, from about 0.05 percent by weight of the cleaning compositions to about 10 percent, about 2 percent, or even about 1 percent by weight of the cleaning compositions.

The laundry detergent composition may comprise one or more polymers. Suitable polymers include carboxylate polymers, polyethylene glycol polymers, polyester soil release polymers such as terephthalate polymers, amine polymers, cellulosic polymers, dye transfer inhibition polymers, dye lock polymers such as a condensation oligomer produced by condensation of imidazole and epichlorhydrin, optionally in ratio of 1:4:1, hexamethylenediamine derivative polymers, and any combination thereof.

Other suitable cellulosic polymers may have a degree of substitution (DS) of from 0.01 to 0.99 and a degree of blockiness (DB) such that either DS+DB is of at least 1.00 or $DB+2DS-DS^2$ is at least 1.20. The substituted cellulosic polymer can have a degree of substitution (DS) of at least 0.55. The substituted cellulosic polymer can have a degree of blockiness (DB) of at least 0.35. The substituted cellulosic polymer can have a DS+DB, of from 1.05 to 2.00. A suitable substituted cellulosic polymer is carboxymethylcellulose.

Another suitable cellulosic polymer is cationically modified hydroxyethyl cellulose. Suitable perfumes include perfume microcapsules, polymer assisted perfume delivery systems including Schiff base perfume/polymer complexes, starch-encapsulated perfume accords, perfume-loaded zeolites, blooming perfume accords, and any combination thereof. A suitable perfume microcapsule is melamine formaldehyde based, typically comprising perfume that is encapsulated by a shell comprising melamine formaldehyde. It may be highly suitable for such perfume microcapsules to comprise cationic and/or cationic precursor material in the shell, such as polyvinyl formamide (PVF) and/or cationically modified hydroxyethyl cellulose (catHEC).

Suitable suds suppressors include silicone and/or fatty acid such as stearic acid. The liquid laundry detergent composition maybe coloured. The colour of the liquid laundry detergent composition may be the same or different to any printed area on the film of the article. Each compartment of the unit dose article may have a different colour. Preferably, the liquid laundry detergent composition comprises a non-substantive dye having an average degree of alkoxylation of at least 16.

At least one compartment of the unit dose article may comprise a solid. If present, the solid may be present at a concentration of at least 5 percent by weight of the unit dose article.

The second water-soluble film may comprise at least one open or closed compartment. In one embodiment, a first web of open pouches is combined with a second web of closed pouches preferably wherein the first and second webs are brought together and sealed together via a suitable means, and preferably wherein the second web is a rotating drum set-up. In such a set-up, pouches are filled at the top of the drum and preferably sealed afterwards with a layer of film, the closed pouches come down to meet the first web of pouches, preferably open pouches, formed preferably on a horizontal forming surface. It has been found especially suitable to place the rotating drum unit above the horizontal forming surface unit.

Preferably, the resultant web of closed pouches are cut to produce individual unit dose articles.

Those skilled in the art would recognize the appropriate size of mould needed in order to make a unit dose article according to the present invention.

Preferably, for consumer value and convenience, packages contain sufficient numbers of capsules, which is 10 or more capsules, more preferably 20 or more capsules, even more preferably 30 or more capsules, even more preferably 40 or more capsules and more preferably 50 or more capsules. There may be no more than 70 capsules in the package, preferably no more than 60 capsules.

Preferably the mass (m) of each capsule is in the range $5\ g<m\leq 30\ g$ preferably $10\ g<m<30\ g$. The package comprises at least 20 capsules, preferably at least 30 capsules, more preferably at least 40, even more preferably at least 50 and up to 100 capsules in one package. As the weight of each capsule increases, so will the force exerted by the capsules on the package also increases. Thus maintained rigidity is more and more important.

Each capsule may comprise at least two sheets of water-soluble film, the at least two sheets of film being sealed together by a seal (known as a sealing web) extending around the periphery of the capsule.

Preferably the capsule further comprises an internal seal which partitions the capsule to provide said at least two compartments. This can increase the sealing area for each capsule, and in turn increases the risk of seal contamination during filling. The invention is particular advantageous for such capsules.

All compartments are filled with a liquid or gel. However, additional compartments may also be filled with gels, powders or any combination thereof. So, for example, some capsules may have a liquid-containing compartment and a powder-containing compartment, or there may be liquid-gel, gel-powder combinations (each form e.g. liquid, gel, powder in a different compartment).

Suitable compositions that may be split into different components for use in the present invention include those intended for laundry (substrate cleaning, softening and/or treatment) or machine dish washing.

The multiple compartment capsules may comprise different parts of a treatment composition which, when combined, make up the full treatment composition. By that is meant that the formulation of each of the parts of the treatment composition is different either in its physical form (e.g. viscosity), its composition or, preferably its colour/opacity.

Preferably capsules are manufactured by forming, more preferably thermoforming a sheet or sheets of water-soluble film. During forming or thermoforming recesses in the film. The recesses are then filled and a second often thinner sheet superposed over the filled recesses and sealed it to the first sheet of film around the edges of the recesses to form a flat sealing web. Substrate treatment compositions of a viscosity above the range of the invention take longer to settle into the capsule recess after filling. If they have not settled by the time the second sheet is superposed and sealed, the second thinner sheet may be stretched over the piled up formulation which may comprise the film. This stretching can create leaks by exacerbating pin holes in the thin film. The viscosity range of the invention is thus particularly advantageous for such capsules.

Where the chambers of the unit dosed product or capsule are stacked, i.e. they are not side by side but placed on top of another chamber, the product will comprise at least three films wherein one chamber is slead by another chamber being formed over the top of the first chamber.

Further more, relaxation of the first film typically then causes the applied second sheet to bulge out when the vacuum is released from the first sheet of film in the mould. This stretch Suitable water-soluble substrate materials for the capsule film include one or more water-soluble polymers. In one embodiment, the water-soluble substrate includes polyvinyl alcohol, a modified polyvinyl alcohol, polyvinyl acetate, polyacrylates, water-soluble acrylate copolymers, polyaminopropyl sulfonic acid and salts thereof, polyitaconic acid and salts thereof, polyacrylamides, polyvinylpyrrolidone, pullalan, cellulosics (such as carboxymethylcellulose and hydroxypropyl methyl cellulose), water-soluble natural polymers (such as guar gum, xanthan gum, carrageenan and starch), water-soluble polymer derivatives (such as modified starches, including ethoxylated starch and hydroxylated propylstarch, poly(sodium acryloamido-2-methylpropane sulfonate, polymonomethylmaleate and salts thereof), copolymers thereof and combinations thereof. In some embodiments, the water-soluble substrate includes, or consists essentially of, polyvinyl alcohol, a modified polyvinyl alcohol, polyvinyl acetate, carboxymethylcellulose or hydroxypropyl methyl cellulose.

In particular embodiments, the water-soluble substrate includes, or consists essentially of, polyvinyl alcohol, polyvinyl acetate and/or a modified polyvinyl alcohol. Polyvinyl alcohol, polyvinyl acetate and modified polyvinyl alcohols can provide stable water-soluble substrates that have suitable dissolution rates.

The water-soluble substrate material may also contain one or more plasticizers. Examples of plasticizers include, but are not limited to glycerol, glycerin, diglycerin, ethylene glycol, diethylene glycol, triethylene glycol, tetraethylene glycol, monopropylene glycol, polyethylene glycol, neopentyl glycol, trimethylpropane polyether polyols, sorbitol, ethanolamines and mixtures thereof. Suitable films include Monosol M4045 and Monosol M8045 (75, 82, 88 & 90 micron) and Aicello PT films (PT 75 & 90).

The film is preferably from 40 to 150 micrometer thick.

The second film is typically of a similar type to that used for the first film, but slightly thinner. Thus, in embodiments, the second film is thinner than the first film. In embodiments the ratio of thickness of the first film to the thickness of the second film is from 1:1 to 2:1.

In embodiments the first film thickness (pre-thermoforming) is from 50 to 150 micrometer, from 60 to 120 micrometer, or from 80 to 100 micrometer. After capsule manufacture generally the average thickness of the first film will be from 30 to 90 micrometer, or from 40 to 80 micrometer.

In embodiments the second film thickness (pre-thermoforming) is from 20 to 100 micrometer, from 25 to 80 micrometer, or from 30 to 60 micrometer.

The multi-compartment capsule is produced by a process of thermoforming. Such a process may advantageously comprise the following steps to form the capsule:

(a) placing a first sheet of water-soluble polyvinyl alcohol film over a mould having sets of cavities, each set comprising at least two cavities arranged side-by-side;
(b) heating and applying vacuum to the film to mould the film into the cavities and hold it in place to form corresponding recesses in the film;
(c) filling the different parts of a substrate treatment composition, each of which may have a different colour/opacity (as well as different treatment function) into the side and central recesses, the parts together forming a full detergent composition;
(d) sealing a second sheet of film to the first sheet of film across the formed recesses to produce a multi-compartment capsule having compartments located on opposite connected to each other and separated by a continuous internal sealing web;
(e) cutting between the capsules so that a series of multi-compartment compartment capsules are formed, each capsule containing a part of a treatment composition in multiple compartments (one central and two side compartments).

Sealing can be done by any suitable method for example heat-sealing, solvent sealing or UV sealing or ultra-sound sealing or any combination thereof. Particularly preferred is water-sealing. Water sealing may be carried out by applying moisture to the second sheet of film before it is sealed to the first sheet of film to form the seal areas.

A preferred thermoforming process uses a rotary drum on which the forming cavities are mounted. A vacuum thermoforming machine that uses such a drum is available from Cloud LLC. The capsules according to the invention could also be made by thermoforming on a linear array of cavity sections. Machines suitable for that type of process are available from Hoefliger. The following example description is focused onto the rotary process. A skilled person will appreciate how this would be adapted without inventive effort to use a linear array process.

Bittering Agent

The water-soluble package of the present invention includes a bittering agent. Bittering agents are generally known. The bittering agents may be any of those described for the packaging.

The bittering agent is typically incorporated within or film-coated on the exterior surface of the water-soluble package. Additionally or alternatively, the bitter agent is included in the water-soluble package as a powdered bittering agent in a powder coating applied to the exterior surface of the water-soluble package.

In particular embodiments, the bittering agent is incorporated within (included in) the water-soluble substrate. For example, the bittering agent may be incorporated into the matrix of a water-soluble polymer included in the water-soluble substrate by dissolving the bittering agent in a water-soluble polymer solution before the water-soluble substrate is formed. The bittering agent may be present in water-soluble substrate material in a range of 100 to 5000 ppm, preferably 200 to 3000 ppm, more preferably 500 to 2000 ppm, based on the weights of the bittering agent and water-soluble substrate. For example, 1 mg of bittering agent may be incorporated into 1 g of water-soluble substrate to provide the bittering agent at 1000 ppm.

Film-coating of a bittering agent on the surface of the water-soluble substrate can be performed by known techniques, such as spraying or printing of a bittering agent solution onto the surface of the water-soluble substrate.

The bittering agent can be included in, film coated on and/or included in a powder coating on the exterior surface of the water-soluble substrate in one or more of the printed regions. There may be no adverse effects on the quality of UV-cured ink printed matter when the bittering agent is included in, film coated on and/or included in a powder coating on the exterior surface of the water-soluble substrate in the printed regions. In particular, there may be no adverse effects on the quality of UV-cured ink printed matter when the bittering agent is incorporated within the water-soluble substrate in the printed regions. In some embodiments, the bittering agent is incorporated within the water-soluble substrate homogenously. In this way, the inclusion of the bittering agent into the water-soluble substrate and printing of the water-soluble substrate can be simplified.

Miscellaneous

The unit dosed products described herein are suitable for use in a substrate treatment method, suitably a laundry or machine dish washing method. Thus, a further aspect of the present invention provides use of unit dose products or capsules as described herein in a method of cleaning, suitably a laundry or machine dish washing method. Suitably the method includes opening the packaging by unlocking the child resistant closure, retrieving one or more capsules from the packaging, placing the capsule/s in the drum or dosing drawer or any dosing device of a washing machine prior to commencement of a wash cycle.

The capsules are particularly suitable for use in (substrate) washing machines and in dishwashing machines amongst other applications. They can also be used in manual laundry or dishwashing operations. In use the capsules according to the invention are preferably, and conveniently, placed directly into the liquid which will form the wash liquor or into the area where this liquid will be introduced. The capsule dissolves on contact with the liquid, thereby releasing the detergent composition from the separate compartments and allowing them to form the desired wash liquor.

Preferably, the capsule ruptures between 10 seconds, preferably between 30 seconds and 5 minutes once the unit dose article has been added to 950 ml of deionised water at 20-21° C. in a 1 L beaker, wherein the water is stirred at 350 rpm with a 5 cm magnetic stirrer bar. By rupture, we herein mean the film is seen to visibly break or split. Shortly after the film breaks or splits the internal liquid substrate composition may be seen to exit the article into the surrounding water.

A number of proposals and aspects are described herein, which proposals and aspects are intended to be combined to achieve improved or cumulative benefits. Thus, any one aspect may be combined with any other aspect. Similarly the optional features associated with any one of the aspects may apply to any one of the other aspects.

The carton comprises a stiff cellulose based, biodegradable paperboard having grammage 225 or above to achieve a minimum compression strength of 300N. This is tested by compressing the box between two plates until the box is crushed. The maximum load (before crushing is recorded). The packaging design has 4 pairs of locking members 7, 9, 11, 13 each comprising a tab on the receptacle 3 and a recess on the lid 5. Pair 7 is arranged separated from pairs 11 and 13 by a distance corresponding to the average span between a thumb and forefinger of the hand of an adult. Likewise each pair is separated from 2 of the other pairs by such a distance. Only when all both pairs are released simultaneously it is possible to open the lid of the packaging container.

The distance of each pair of locking elements and arrangement on the corners is such that it is impossible for a child can press all four locking elements simultaneously. The rigidity of the packaging ensures that the locking members of each pair are aligned during closure to render the packaging inaccessible to children.

Embodiments of the invention will now be described with reference to the following non-limiting drawings in which.

Figure 1:
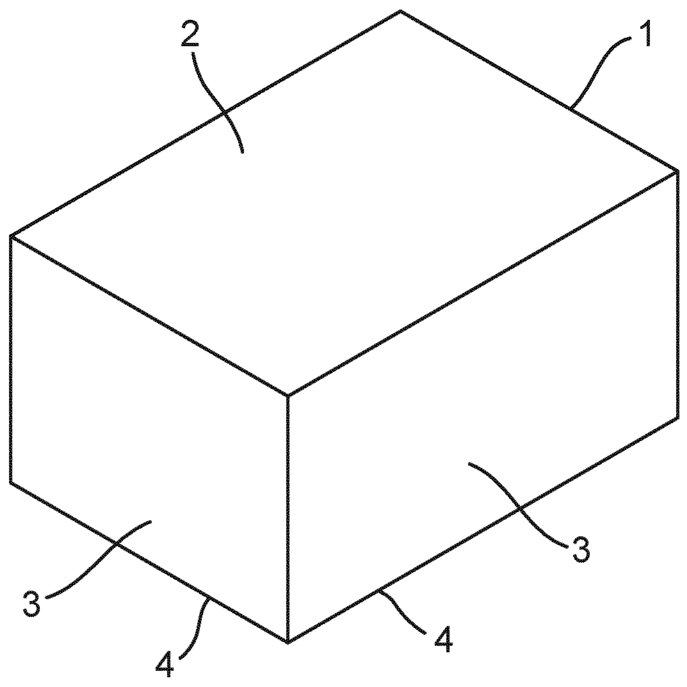
FIG. 1 is a perspective view of a lid.

In detail, FIG. 1 shows a lid (1) for a biodegradable package. The lid comprises a top (2) and depending from each edge of the top (2) a top side wall (3). The shown side walls end at a bottom edge (4).

Figure 2:
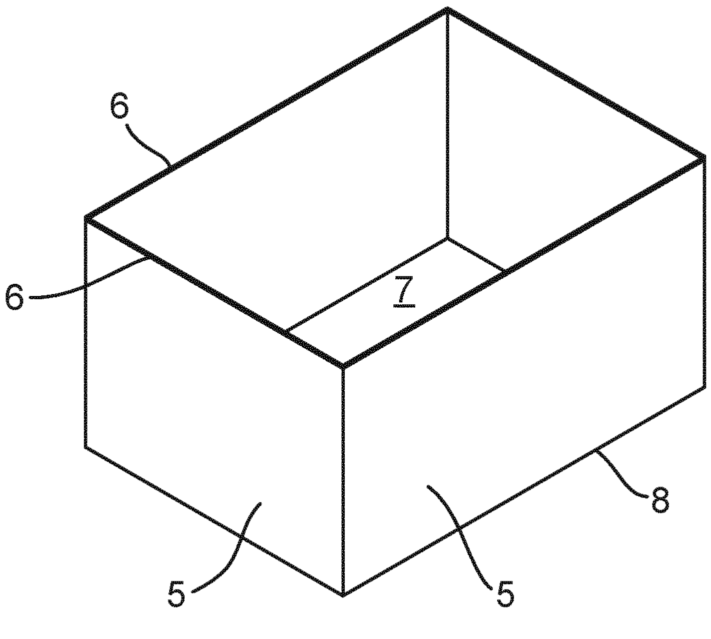
FIG. 2 is a perspective view of a base.

FIG. 2 shows a base (8) which has a bottom (7) and upstanding from the edges of the base (7) are base side walls (5) which end at a top edge (6).

Dimensionally, the lid (1) and base (8) are such that they slidingly co-operate to close the package and maintain the contents.

Figure 3:
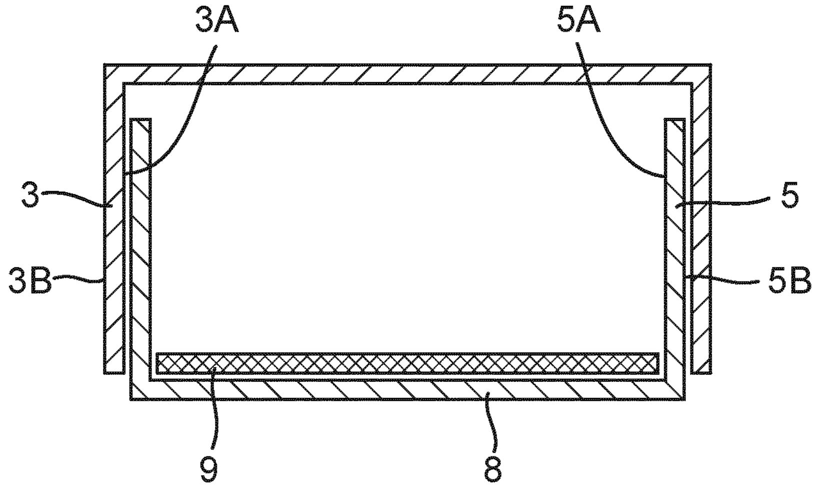
FIG. 3 is a cross-section of a biodegradable package.

FIG. 3 is a cross section along A-A and shows a lid (1) and a base (8) engaged to close the package.

The package also has an absorbent pad (9) for improving the leak protection of the package. The pad (9) is maintained at the bottom of the package on the base and under any contents of the package. Any leakage from the unit dose capsules is thereby minimised or controlled by the absorbent pad (9).

The lid side walls (3) are shown to have an inner surface (3A) and an outer surface (3B). The outer surface (3B) is a bleached surface and has water-based barrier material coated thereto. The inner surface (3A) is an unbleached surface and does not have barrier material applied thereto.

The base side walls (5) are shown to have an inner surface (5A) and an outer surface (5B). The outer surface (5B) is an unbleached surface and does not have water-based barrier material coated thereto. The inner surface (5A) is a bleached surface and has barrier material applied thereto. The inner surface of the base (5B) also has a thermoplastic elastomer-based barrier material applied thereto.

Figure 4:
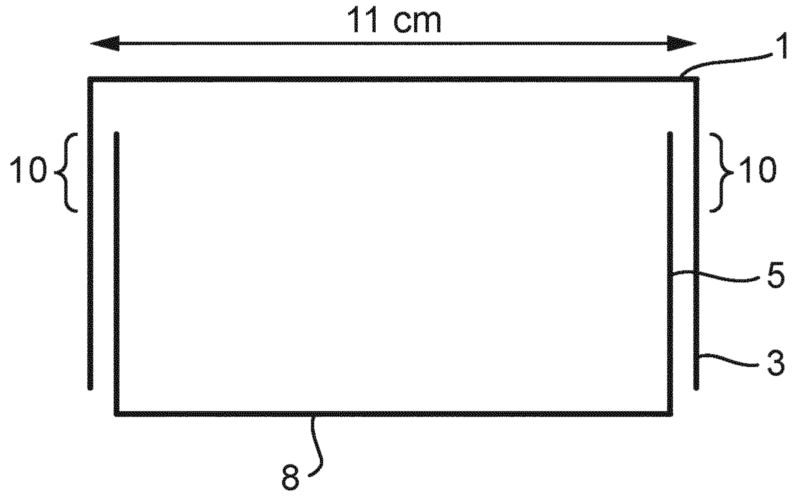
FIG. 4 is a schematic side elevation of a biodegradable package.

FIG. 4 is a schematic to show the relationship between the dimensions of the lid and the child proof closure.

In side view, the width is the lid is shown to be 11 cm. This is the width at the point along the length that the user activates the child proof closure mechanism. The user uses fingers and thumb to activate the child proof mechanism activation zones (10) on either side of the lid. The actual mechanism is not shown but activation of the zone permits separation of the lid from the base as the user depresses the zones and pulls the lid away from the base.

EXAMPLE 1

The water soluble capsules comprise laundry treatment compositions dispensed to each of the three compartments is as follows:

| Compartment #1 | Compartment #2 | Side compartment #2 |
|---|---|---|
| Surfactant | Surfactants | Surfactants |
| Polymer cleaning | Polymer cleaning | Polymer cleaning |
| Sequestrant | Sequestrant | Sequestrant |
| Water | Enzyme -cellulase | Enzyme - protease |
| Hydroptrope | Fluorescer | Water 8% wt. |
| Opacifier | Water 8% wt | Hydrotrope |

-continued

| Compartment #1 | Compartment #2 | Side compartment #2 |
|---|---|---|
| | Hydrotrope<br>Dyes<br>Perfume | Dyes |

The unit dosed products comprise water soluble film printed on the inside.

EXAMPLE 2

Further example formulations of unit dose products are provided below.

| | DESCRIPTION | |
|---|---|---|
| Raw Material | 1<br>Inclusion level as 100% | 2<br>Inclusion level as 100% |
| SURFACTANT | | |
| LAS/SLES/NI ratio | 58/30/12 | 47/0/53 |
| LAS acid | 25.20 | 21.22 |
| SLES 3EO | 13.00 | |
| MIPA-LES 2EO | | |
| Non Ionic 7EO | 5.60 | 23.50 |
| Fatty acid/Oleic acid | 6.60 | 8.64 |
| HYDROTOPE | | |
| Glycerol | 7.70 | 13.10 |
| Mono Propyl Glycerol | 12.80 | 8.30 |
| NEUTRALIZER/BUFFER | | |
| MEA | 10.50 | 6.50 |
| WHITENESS AGENT | | |
| CBS-CL | 0.39 | 0.40 |
| SALTS & SEQUESTRANTS & BUILDERS | | |
| Dequest 2010 | 2.90 | |
| Dequest 2066 | | 0.65 |
| Citric Acid | 0.70 | |
| Enzymes | | |
| Mannanase (% as Mannaway 4L) | 1.00 | 1.00 |
| Cellulase (% as Celluclean4500T) | 1.00 | 1.00 |
| Protease (% as Savinase ultra 16L) | 1.00 | 1.00 |
| Amylase (% as Stainzyme 12L) | 1.00 | 1.00 |

The unit dosed products comprise water soluble film printed on the inside.

The invention claimed is:

1. A package comprising at least one layer of biodegradable material and containing a plurality of unit dose products, at least one unit dose product comprising a detergent composition within a sealed compartment formed by a water soluble film, said film being printed on an inner surface, facing the detergent composition, and wherein the detergent composition comprises from 5 to 15% wt. water, wherein the at least one layer of biodegradable material is paper-based with a weight average fibre length of cellulose in the paper between 3.5 to 5 mm.

2. The package according to claim 1 comprising a lid and a base member, wherein the lid and base member co-operate to form a closed container.

3. The package according to claim 2 wherein the base member comprises a barrier material.

4. The package according to claim 2 wherein the lid comprises a barrier material.

5. The package according to claim 2 having a pair of opposing long walls, each long wall having a pressable zone which is pressed to engage a child proof locking mechanism and enable the lid and base member to be separated.

6. The package according to claim 2, wherein the lid further includes a top sheet and two pairs of opposing walls attached thereto, and the base member has a bottom surface which has two pairs of opposing walls attached thereto.

7. The package according to claim 6, wherein the package includes an absorbent pad at the bottom surface of base member under the plurality of unit dose products.

8. The package according to claim 1 having an average width, an average length and an average height, wherein said average width is from 9 to 15 cm.

9. The package according to claim 1 wherein the unit dose products comprises a bittering agent.

10. The package according to claim 1 wherein the film comprises a phthalocyanine based pigment.

* * * * *